(12) United States Patent
Passaggio et al.

(10) Patent No.: US 6,208,761 B1
(45) Date of Patent: Mar. 27, 2001

(54) VIDEO CODING

(75) Inventors: Filippo Passaggio; Guiseppe Suanno, both of Genoa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/004,860

(22) Filed: Jan. 9, 1998

(30) Foreign Application Priority Data

| Jul. 11, 1995 | (SE) | 9502557 |
| Oct. 24, 1995 | (SE) | 9503735 |
| Oct. 24, 1995 | (SE) | 9503736 |
| Jul. 11, 1996 | (SE) | PCT/SE96/00943 |

(51) Int. Cl.$^7$ ........................ G06K 9/46
(52) U.S. Cl. ........................ 382/237; 382/232
(58) Field of Search ............... 237/232, 216, 237/233, 234, 236, 235, 237, 238, 239, 244, 245, 246, 247; 341/59

(56) References Cited

U.S. PATENT DOCUMENTS

| 4,110,795 | 8/1978 | Spencer . | |
| 4,245,257 | 1/1981 | Yamazaki et al. . | |
| 4,805,017 | 2/1989 | Kanoeko et al. . | |
| 5,157,489 | 10/1992 | Lowe . | |
| 5,163,101 | * 11/1992 | Deering | 382/216 |
| 5,321,397 | * 6/1994 | Stone | 341/59 |
| 5,325,126 | 6/1994 | Keith . | |

FOREIGN PATENT DOCUMENTS

| 0220110-A2 | 4/1987 | (EP) . |
| 2260236 | 4/1993 | (GB) . |

* cited by examiner

Primary Examiner—Joseph Mancuso
Assistant Examiner—Vikkram Bali
(74) Attorney, Agent, or Firm—Nixon & Vanderhye P.C.

(57) ABSTRACT

Digitalized video images are compressed in several steps in order to provide a system for transmitting moving video pictures via narrow band channels, such as the telephone network. The system is based on any extension of the bit-plane coding technique to video sequences and lossy conditions. The compression technique can also be advantageously used in a lossless compression system. The system involves the steps of bit plane representation and skipping the least significant bit plane(s), shifting the pixels, coding with a Gray code, the use of segmentation, and motion-estimation/motion compensation and application of a transmit/not transmit/motion compensate (TX/NT/MC) procedure, exploiting of the temporal redundancy of two corresponding bit planes via an XOR operation on two successive images, and a plane-by-plane application of an extended RLEID technique. The RLEID technique includes coding a run of like binary symbols with one word, the run including a transition between the penultimate and ultimate binary symbol.

5 Claims, 5 Drawing Sheets

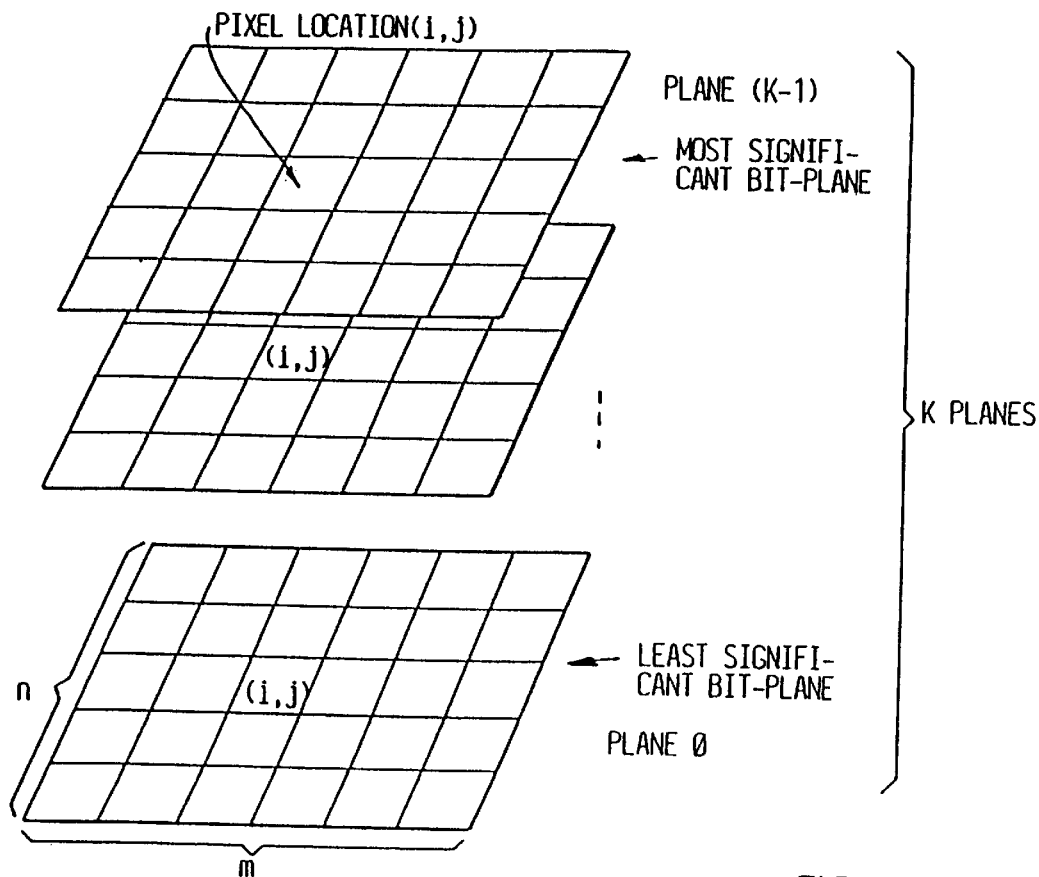

VIDEO CODING

TECHNICAL FIELD

The present invention is related to a methods and devices for compressing and coding digitally represented moving pictures, grey scale as well as colour, which are to be transmitted on a channel and in particular a channel which has a relatively small capacity or bandwidth as well as a system for transferring moving pictures using compression of the pictures.

BACKGROUND AND PRIOR ART

In many applications involving transmission of video signals, the capacity of the channel used is limited. A digitalized video image, however, consists of a very large number of bits. Hence, when transmitting such an image, consisting of a very large number of bits, over a channel which has a limited bandwidth on which data traffic having a low or a very low bit rate can be transmitted, transmission times for most applications become unacceptably long, if every bit of the image has to be transmitted. This is especially true i n the case of moving pictures, where strict real time constraints exist.

Therefore, much research efforts in recent years have concerned coding methods and techniques for digitalized images, aiming at reducing the number of bits to be transmitted as much as possible.

These methods can be divided into two groups:

Lossless methods, i.e. methods exploiting the redundancy in the image in such a manner that the image can be reconstructed by the receiver without any loss of information, i.e. the reconstructed image coincides exactly with the original image.

Lossy methods, i.e. methods exploiting the fact that all bits are not equally important to the receiver. In these methods the received image is not identical to the original, but looks, e.g. for the human eye, sufficiently alike the original image.

In the field of video coding for low and very low bit rate applications, many of the present approaches involve the use of the frequency domain, e.g. by means of the Discrete Cosine Transform (DCT).

These approaches led to different video coding standards: JPEG (Joint Photographic Experts Group) for still image compression; MPEG I/II (Moving Picture Experts Group) for storing and multimedia applications and for video coding at medium—high bit rates; CCITT Recommendation H.261 (Px64) for real time video coding of video conferences, remote surveillance, and video telephone applications; CCITT Recommendation H.263, which is related to H.261, but is developed for lower bit rates (16–64 kilo bits per second kbps).

Other techniques are, for example, based on wavelets and subband coding methods, fractal transformations, vector quantization, etc. These compression methods work quite well in many conditions. However, these methods have problems at very high compression ratios, such as in the area of real-time transmission of moving pictures over channels having low capacities, such as the public telephone lines.

Although the efforts and improvements made, the compression of the images in relation to the achieved quality of the resulting image, the compression/quality ratio, still remains quite low and not good enough for many applications, especially in the case of narrow band channels having capacities less then 64 kbps, such as the public telephone lines. In particular problems remain in the introduction of low-pass effects, blocking effects and undesired frequencies.

Also, the existing coding methods are based on computationally complex and expensive systems, comprising frequency or fractal transformations, filtering stages and vector quantization processes. In order to perform these algorithms in real time expensive processors such as DCT processors, zigzag processors, blocking processors etc. are required.

Another possible approach is the bit plane coding technique.

This method maps the pixels of a digitalized image into a number of binary bit planes the first one of which usually consists of the most significant bits of the pixels. Thus, the image which consists of pixels, which in turn consist of a number of bits, are mapped into a number of bit planes, where the number of bit planes is equal to the number of bits per pixel (bpp).

The purpose of mapping the bits into bit planes is to exploit the spatial redundancy of the digitalized video image. When exploiting, by means of compression, these redundancies no information is lost, and thus the images compressed and transmitted using this technique can be recreated exactly bit by bit, i.e. the technique is lossless. This kind of techniques has been introduced and successfully applied in cases of lossless coding of still pictures, such as X-ray medical images, satellite and space images and facsimile images.

The method of bit plane coding is quite efficient compared to other lossless existing coding methods for coding still images.

In the book "Digital Image Compression Techniques", M. Rabbani, P. W. Jones, SPIE Optical Engineering Press Washington, 1991, the bit plane coding technique is described. The book also deals with Gray code in the field of bit plane coding, for lossless coding of still images.

Further, in U.S. Pat. No. 5,374,945 a method is disclosed for grey level printing, in which several bit plane datasets comprise a bogus bit plane, most significant bit plane, next-to-most significant bit plane, least significant bit plane, and next-to-least significant bit plane and a significance of each said bit plane corresponds to a printing time length.

U.S. Pat. No. 5,142,619 patent discloses techniques using the XOR-operation. A device described in the document has means provided for comparing the contents of two bit planes in order to compare the respective pixel locations and exclusive OR-ing each pair of corresponding pixels to set a corresponding pixel location in a third bit plane to reflect similarity or dissimilarity between the compared pair of pixels of two bit planes of the same image.

U.S. Pat. No. 4,653,112 concerns image data management, where image data are organized in bit planes. Data comprising the most to the least significant bits are arranged in the first to the last bit planes respectively.

U.S. Pat. No. 4,546,385 relates to data compression of graphic images. A graphic image has at least first (most significant bit) and second (least significant bit) bit planes. The most significant bit of a pixel and the successive pixel are compared using an exclusive OR-operation on a spatial dimension, i.e. the XOR operation is performed between pixels of the same image.

The European patent application EP-A1 0 547 528 discloses coding of binary bit planes eliminating the need for forming a Gray code bit plane representation. The invention uses different significances for different bit planes.

SUMMARY

It is an object of the present invention to overcome the disadvantages and problems associated with the methods described above, and to provide methods and devices by means of which moving pictures of a good quality can be compressed for transmission and storage purposes.

This object is achieved by the present invention the characteristics of which are set out in the appended claims.

Thus, a method is provided for coding both grey scale and colour images, in particular moving pictures. This method is also based on bit plane coding, and can transmit moving pictures of relatively good quality only requiring bit rates of approximately 10 kbps. The method for achieving this can be divided into the following five substeps:

I. Representing the digitalized images by means of the bit plane representation, and skipping from the achieved result the planes corresponding to the bits that carry the least information, i.e. the least significant planes (plane skipping).

II. Coding the remaining bit planes with the Gray code, and when doing this, in order to maximally exploit the redundancy of the bit planes and to reduce the dynamic of the resulting signal, before making use of the Gray code, shifting the bits of the remaining planes into the lowest positions and then padding the vacant positions with zeroes.

III. Reduction the number of bits needed to be transmitted by means of segmentation of the frames and by applying a motion estimation (ME) procedure to corresponding segments, which makes it possible to obtain motion compensated (MC) predictions of the segments of the frame in question and then by means of a transmit/not transmit mechanism (TX/NT) reduce the number of regions to transmit.

IV. Exploitation of the temporal redundancy by means of an XOR-operation, which is carried out plane-by-plane on two corresponding bit planes of two successive images or frames.

V. Coding the output sequence plane-by-plane by means of a specially developed mono dimensional run length encoding (extended RLE1D) technique which is designed to exploit the fact that the binary sequence to be coded consists of long runs of the same symbol and also has relatively many isolated symbols of the other kind, e.g. long runs of binary zeroes are interrupted by isolated binary ones.

The coding techniques above has several advantages compared to the techniques involving the use of the frequency domain. The technique work directly in the spatial domain. This avoids the problems of introduction of low-pass effects, blocking effects, undesired frequencies, which commonly affect other techniques based on transformation. Furthermore, the method only comprises simple manipulations of the bits of the digitalized image, and only elementary operations are involved. This makes the method easy to implement, and particularly suitable for VLSI implementations, and the realization of low-cost systems.

The method above can also be simplified and made less computational expensive by means of introducing transmit/not transmit (TX/NT) procedure to the different regions of the segmented images before a possible application of ME/MC only to the transmitted regions.

Also, the technique as described above can be used for lossless compression of moving pictures. In that case all substeps leading to a degradation of the image are not used, i.e. no plane skipping is performed and the TX/NT procedure is also not applied.

BRIEF DESCRIPTION OF THE DRAWINGS

The invention will now be described by way of non-limiting embodiments and with reference to the accompanying drawings, in which:

FIG. 1 is a picture illustrating the bits of the pixels representing a digitally coded image, using the bit plane coding method.

FIGS. 7a and 7b illustrate the use of a conventional RLE1D technique and an extended RLE1D technique for sequences comprising many isolated binary ones.

DETAILED DESCRIPTION OF EMBODIMENTS

Figure 2A:
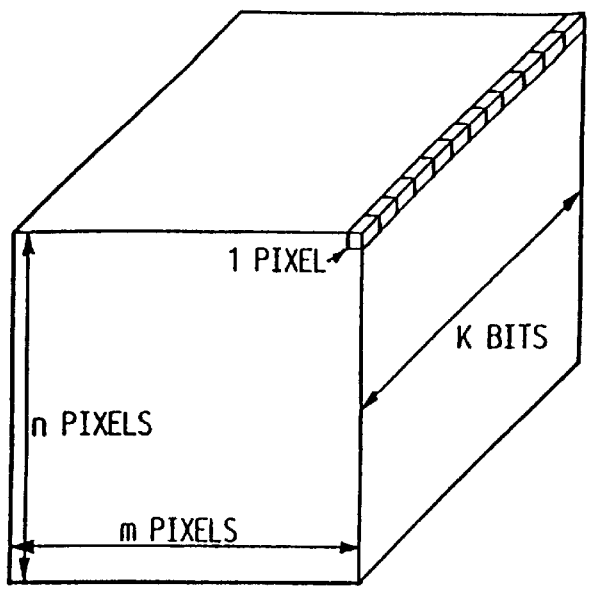
FIGS. 2a and 2b are pictures similar to that of FIG. 1, and illustrating the bit planes before and after some bit planes have been skipped by means of the plane skipping process, respectively.

When compressing a grey scale or colour digitalized image, it is first coded using the conventional bit plane coding technique, but in order to reduce the number of bits which are to be transmitted the lower order bit planes, i.e. the planes consisting of the least significant bits are skipped. This apriori reduction of the dynamics of the image of course results in a loss of information, which in turn results in that the compression is no longer lossless. Still the bits lost are the ones carrying the least information, i.e. the lossy step has been introduced in the least significant part of the information.

The achieved lossy method relies on the experimental fact that the human eye is relatively less sensitive to the type of distortion introduced by the coarser quantization caused by the skipping of the least significant bit planes. Moreover, these bits are often corrupted by noise, in particular thermal noise introduced by the sensors used for the image acquisition, cameras, CCDs, etc. These bits are therefore usually useless from a visual point of view.

Unfortunately, no completely good measures of the achieved quality exist in literature, which makes it possible to objectively compare this method to others. It is easily seen that a skipping of planes as suggested above results in a bad quality according to the most common measure, the Mean Square Error (MSE).

Nevertheless, experiments show that images obtained with the method using bit plane coding and skipping the least significant planes (the plane skipping method) are interpreted by the human eye as images having a reasonably good quality. In particular, for low plane skipping factors, i.e. skipping of only one or a few bit plane(s), no distortion at all is perceived.

As known in literature, the lack of a good measure of how the human eye interprets the quality of an image compressed with a lossy technique results in that comparisons between different coding systems and coding techniques in this aspect have to be based on experimental results. Experimental results regarding the bit plane skipping technique show that usually several of the least significant bit planes can be skipped without loosing much from the human eye's point of view. On the contrary, to a certain point, no distortion at all is perceived.

The method as described above does not only involve a reduction in the redundancy, because of the reduction of the planes to be coded. Most significant bit-planes are also characterized by highly structured information. By taking this into account, this leads to the possibility of achieving very high compression ratios through bit-plane coding techniques.

After the steps of representing the digitalized image by means of the bit plane representation and skipping of the least significant bit planes have been performed, an encoding of the remaining bit planes is performed. The encoding aims at maximally exploiting the redundancy of the bit planes. First of all, the spatial redundancy is addressed. One conventional method to minimize the spatial redundancy, in this type of application, i.e. the bit plane coding, is to use the Gray code instead of the conventional binary alphabet when mapping the pixels of an image.

The Gray code method is well known in literature. It was developed for and is used in applications involving lossless coding and absence of loss of information.

In the method described herein the Gray code is applied in a method associated with loss of information, i.e. the plane skipping mechanism. In this case, when the Gray code is applied in association with the plane skipping technique, experiments have revealed that on one hand when applying the Gray code before making use of the plane skipping technique, the compression achieved is substantial but the visual quality of the received images is reduced and poor. In particular, the experiments showed that this method results in a hard visual loss of details and in a poorer quality. On the other hand, the experiments showed that when first applying the plane skipping technique on the binary coded information and then applying the Gray code, this method results in a very good quality, i.e. the same as without the use of the Gray code. However, the compression achieved is no longer as high as when applying the Gray code before the plane skipping technique.

The reason for this phenomenon is that the Gray code operation has been originally developed for lossless conditions, whereas in this case it is applied in lossy conditions. The Gray code operation performed on the lossy plane skipped signal causes an increase of the dynamic of the signal of one bit, which of course reduces the achieved compression.

A solution to the problem with an increased dynamic range is to introduce a shifting mechanism to the bit planes. Thus, the sequences forming binary words which correspond to different pixels and the values thereof and to which the plane skipping technique have been applied are shifted to the lowest positions of the sequence, which have been left empty after the plane skipping step of the method, before being mapped using the Gray code. Before making use of the Gray code the positions made vacant by the plane shifting step are filled by means of padding the positions with zeroes. It is simple to carry out this operation, only comprising a bit shift operation of a predetermined number of steps and the normal zero padding executed in a shifting operation. Thanks to this operation, the data dynamic is not increased during the step involving the Gray code, and therefore the same compression as in the procedure of first Gray coding the binary plane and then applying the plane skipping technique is achieved, without affecting the quality of the compressed image.

Furthermore, it is to be noted that from a computational point of view, the Gray code operation can be carried out by means of a simple Look Up Table (LUT).

Figure 2B:
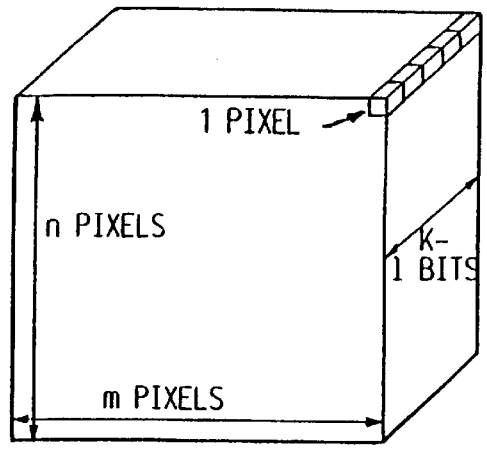
Figure 3:
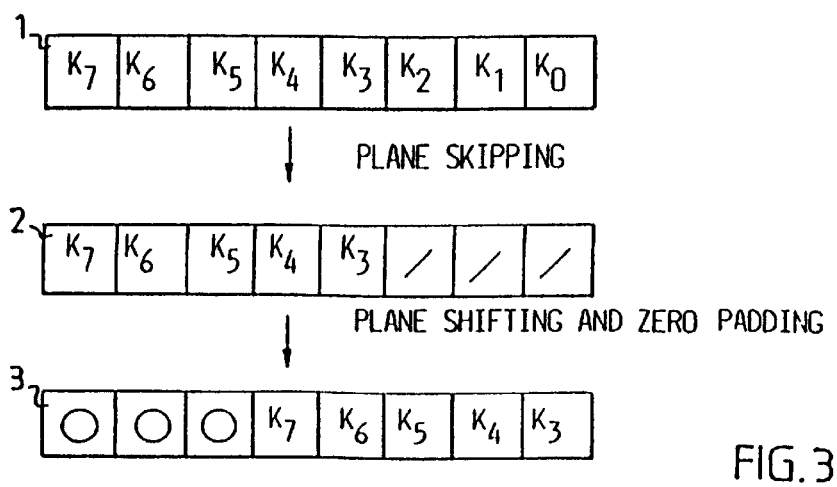
FIG. 3 is a picture illustrating a shift of the bits of one of the pixels in FIG. 2b, and the padding with zeroes thereof.

The method described sofar is also illustrated in FIGS. 1–3.

FIG. 1 illustrates the mapping of m by n (m×n) pixels of an image into k bit planes, where k is equal to the number of bits per pixel (bpp). The bit planes are arranged in such a manner that the (k−1)-th bit plane consists of the most significant bit of each pixel of the image, the (k−2)-th bit plane consists of the next-to-most significant bits of the pixels, and so on until the last (0-th) bit plane, which consists of the least significant bits of the pixels.

FIGS. 2a and 2b illustrate the use of the plane skipping technique. FIG. 2a is a picture illustrating the same as FIG. 1, i.e. the mapping of an m by n pixel image into k bit planes, which are arranged in such a manner that the number of a bit plane corresponds to the significance its pixels. FIG. 2b illustrates the same as FIG. 2a, but including skipping of 1 bit planes holding the least significant bits. Thus, the original image of FIG. 2a consisting of m by n pixels, where each pixel is built up of k bits, is reduced to the image illustrated in FIG. 2b having m by n pixels, which are built up of only k−1 bits.

FIG. 3 illustrates by way of an example the complete procedure of skipping the least significant bits of a pixel, shifting the remaining bits, and zero padding the remaining bits of the pixel. Thus, in the example illustrated in FIG. 3, the original image consists of pixels of length k=8. The bits of a pixel are then arranged as shown at 1. Thereafter the plane skipping mechanism is applied, and the 1=3 least significant planes are skipped. The remaining image then consists of pixels built-up of five (k=8 and 1=3 in this example and k−1=8−3=5) bits. The bits of a pixel are then arranged as shown at 2. These five bits $k_7$–$k_3$ are shifted and then padded with zeroes in the positions left vacant after the shift operation. The bits of a pixel are then arranged as shown at 3. The new sequence formed in this manner is hence identical to the original pixel sequence formed by the k bits in the respective bit planes in FIG. 2b, except for the appended zeroes in the beginning of the sequence, i.e. the remaining most significant bits have been shifted to the positions originally occupied by the least significant bits and the positions made vacant when doing this are padded with zeroes.

This is made in order to maximally exploit the spatial redundancy. A suitable mechanism for exploitation of the temporal redundancy for moving pictures in connection with a bit plane coding technique is also provided. The mechanism has been proved to remarkably increase the achieved compression ratios.

This technique is based on a comparison of two corresponding bit planes of two successive images. The comparison is in the preferred embodiment carried out by means of an XOR-operation involving the two corresponding bit planes. The result of this XOR-operation is a third bit plane, consisting of binary zeroes in every position where the bit value remains unchanged, and binary ones in the positions where the value of the bit has changed. That is, the third, new bit plane has binary zeroes in every position where the two compared bit planes are equal and has binary ones in every position where the two compared bit planes have the same value. In other words, instead of coding all the elements in the new bit plane, only the elements that have changed from the previous bit plane are considered. These elements are termed variations.

This technique, in particular in the case where the number of bits that remained unchanged is large, which is usually the case for two successive frames of moving pictures, increases the exploitation of the redundancy of the bit planes, and thus reduces the entropy factor of the bit planes. Experiments have proved that the mechanism highly increases the compression ratio in most cases.

The method differs from the normal methods applied to exploit the temporal redundancy, which are based on the difference between the pixels (pixel values) of successive frames. A plane-by-plane technique is applied instead by means of the XOR operation. The number of bit planes, i,e, the dynamic range is thereby preserved, which is advantageous for the compression obtained.

Using traditional techniques, the dynamic range is not preserved resulting in one more bit plane to code. For example, if sequences having 8 bits per pixel are considered, i.e. formed by pixels in the range [0, 255], the application of a traditional difference method would lead to a dynamic range of [−255, 255], i.e. an increase of the number of bit planes to 9 bit planes. However, by instead using the XOR operation the dynamic remain in the range [0, 255], i.e. 8 bit planes.

Figure 4:
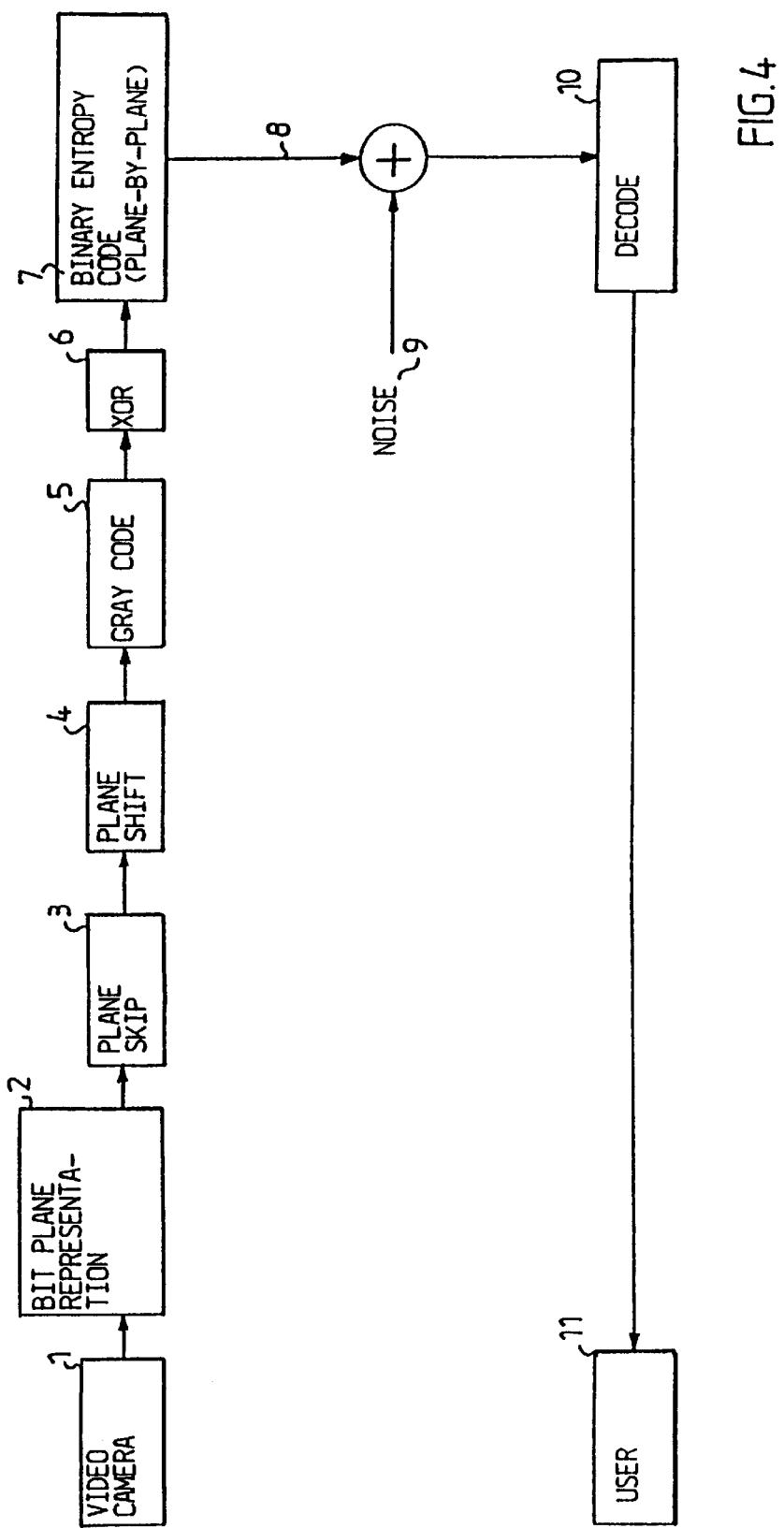
FIG. 4 is a block diagram of a system for transmitting successive video images, illustrating some of the various procedural steps made in the image compression.

In FIG. 4 the various procedural steps and corresponding components of a system for transmitting video coded images are illustrated, the system comprising means for carrying out the various steps as described above.

First the image is captured and digitalized in a block 1, e.g. by a video camera. Then the image is represented by means of conventional bit plane representation in a block 2, and then the unwanted planes are skipped in a block 3. Thereafter the planes are shifted and padded with zeroes in a block 4, and then coded by means of the conventional Gray code in a block 5. After that the temporal redundancy of the corresponding bit planes of successive images is exploited by means of an XOR operation in a block 6. The images compressed in this manner are then coded by means of a conventional entropy coding technique in a block 7 and transmitted on a channel 8, which is usually corrupted by noise 9. The received information is decoded in a block 10, after which the compressed image is available for the intended user 11, for decompression, visualization, digital signal processing, etc.

The images compressed in this manner still contain redundant information. In a system aiming at reducing the bit rate as much as possible while still maintaining the visual quality above a certain level, it is of course desirable to exploit these redundancies as much as possible without decreasing the visual quality too much.

In the case of moving pictures some parts of the image, e.g. the background, will change very little from one image to a successive one. The transmission of these parts of the image will therefore have a very small effect from a visual point of view. One possible and a very common approach to reduce the information in successive images of a moving picture is to apply a transmit/not transmit (TX/NT) procedure which reduces the amount of information by means of removing the information which is not effective or important for the final quality of a compressed sequence.

The transmit/not transmit (TX/NT) procedure exploits the redundant information in such manner that the frames are divided into blocks or segments. These blocks or segments are in the simplest and perhaps most common approaches square blocks of RxR pixels, but the blocks or segments can also have other proportions or have irregular shapes. This division or segmentation of the frames into smaller regions allows the system to identify and localize parts or regions inside the picture which are in some aspect not of interest for the final result. Some of the redundancy of these parts or regions of the image will be properly exploited by the variation procedure (XOR-mechanism), as previously described, but that procedure will not be able to exploit redundancies which are visually redundant, e.g a small change in the tone of a large background area or the appearance/disappearance of a very small object, which is normally not perceived anyway. The transmission/not transmission (TX/NT) procedure avoids the transmission of this information. This type of procedures are well known and have been implemented in association with various compression techniques, and integrated with other types of coding.

The transmission/not transmission (TX/NT) procedure for two successive frames basically consists of the following steps.

A) Segmentation of the two frames into regions, also known as the segmentation phase. The regions can then have structures such as simple uniformly sized square blocks of RxR pixels, e.g. 16×16 pixels, differently sized blocks (also known as quad tree approach) or variously shaped regions.

B) A comparison is then performed between the corresponding regions of the two frames. The aim of this comparison is to obtain some kind of visual distance parameter value. The visual distance parameter shall estimate the distance or difference between the two corresponding regions inside the two frames from a visual point of view. It is therefore desirable to get the visual distance parameter as correlated as possible to the visual interpretation of the two corresponding regions of the two frames, i.e. the more alike the two corresponding regions of the two frames look the smaller, the value of the visual distance parameter adopts. For obtaining this visual distance parameter a large number of different quality measures have been suggested in literature, which can be applied in this step of the procedure, these measures ranging from the simple Mean Square Error (MSE) measure to the complex Human Visual System (HVS) based measures.

C) The value obtained by any of these well known quality measures is then compared to a preset threshold or distance threshold. Based on this comparison the system makes a decision whether it is necessary to transmit (TX) this particular region or if the region is not to be transmitted (NT), i.e. the region does not differ from the previously transmitted corresponding region in such a way, or so much that it is necessary to transmit the current region. That is, the old region can be used instead, without a heavy loss of quality. This procedure is carried out for every region of the frames, and thus only the regions that have changed more than the preset threshold will be transmitted, thereby reducing the information which must be transmitted.

In the type of system described here, i.e. a system based on bit plane coding aiming at reducing the entropy as much as possible, this type of procedure is very efficient, due to the reduction of entropy which is introduced by the transmission/not transmission (TX/NT) mechanism.

In this system, which is based on bit plane coding and in which the dynamic has been reduced by the shifting process as described above, the information content of the frames is different from the traditional compression systems. The coding described sofar avoids small transitions between the pixel values, and the objects in the picture therefore become very well defined from the background. Hence, the dynamic reduction introduced by the shifting process, which is described in more detail below, does not only reduce the dynamic but it also allows to separate the visually important information from the not important information by means of a simple Mean Square Error (MSE) approach, which will be described below. The Mean Square Error (MSE) approach is usually not very efficient because of the low correlation between the MSE and the visual perception, but in the system described, due to the characteristics of the dynamic, the correlation between the visual perception and the MSE increases.

It is therefore possible to introduce the simple MSE mechanism in the transmit/not transmit (TX/NT) procedure, in the case where it is applied to a compression system of the kind described herein without much loss of quality.

The Mean Square Error (MSE) mechanism is performed very simply. A first frame is segmented, i.e. it is divided into regions of e.g. 16×16 pixels (other segmentations such as e.g. the ones described above can of course also be used). The pixels inside one region are then compared to the corresponding pixels of the previous frame, where the comparison is carried out for determining the distance between the corresponding pixels, i.e. the following calculation is performed:

$$\text{Distance} = (P_{current} - P_{previous})^2$$

The operation is repeated for all the corresponding pixels within the two corresponding regions of the frames in order to compute the distances between them and their average distance is determined, i.e. a Mean Square Error operation is carried out for the corresponding pixels within all the regions of the frames. For two corresponding regions, consisting of N pixels each, the following calculation is performed:

$$\text{Distance} = 1/N \Sigma_{I=1}^{N} (P_{(I)current} - P_{(I)previous})^2$$

The value or average distance achieved by this operation is then compared to a threshold, which can be predetermined by a user or automatically adjusted. The outcome of this comparison then determines whether the region of the frame in question is to be transmitted (TX) or if the similarities between the current region and the preceding one are such that a transmission of the region is not necessary from a visual point of view and therefore the corresponding region of the preceding frame can be used instead and then it is determined not to transmit (NT) the region in question.

The regions of a frame, which are decided not to be transmitted by the algorithm described above, are not made subject to any further steps of compression, since they must not be transmitted. The introduction of this non-transmission step will reduce the amount of information that has to be transmitted and thereby the bit rate required will be lowered. The regions that are decided to be transmitted are however subject to additional compression steps, i.e. the Gray code, XOR operation and the entropy coding, as described above.

It is also to be noted that, in the case where the transmitted/not transmitted procedure is decided to be introduced into the compression system, this procedure is to be introduced between the shifting step and the Gray code step of the compression. This is of course made in order to make the MSE-algorithm work properly and to make the correlation between the distance evaluated by the MSE-algorithm and the visual perception high. At the same time this reduces the computational cost. It is further to be noted that the compression system will work very well even without the introduction of the (TX/NT) procedure.

Figure 5:
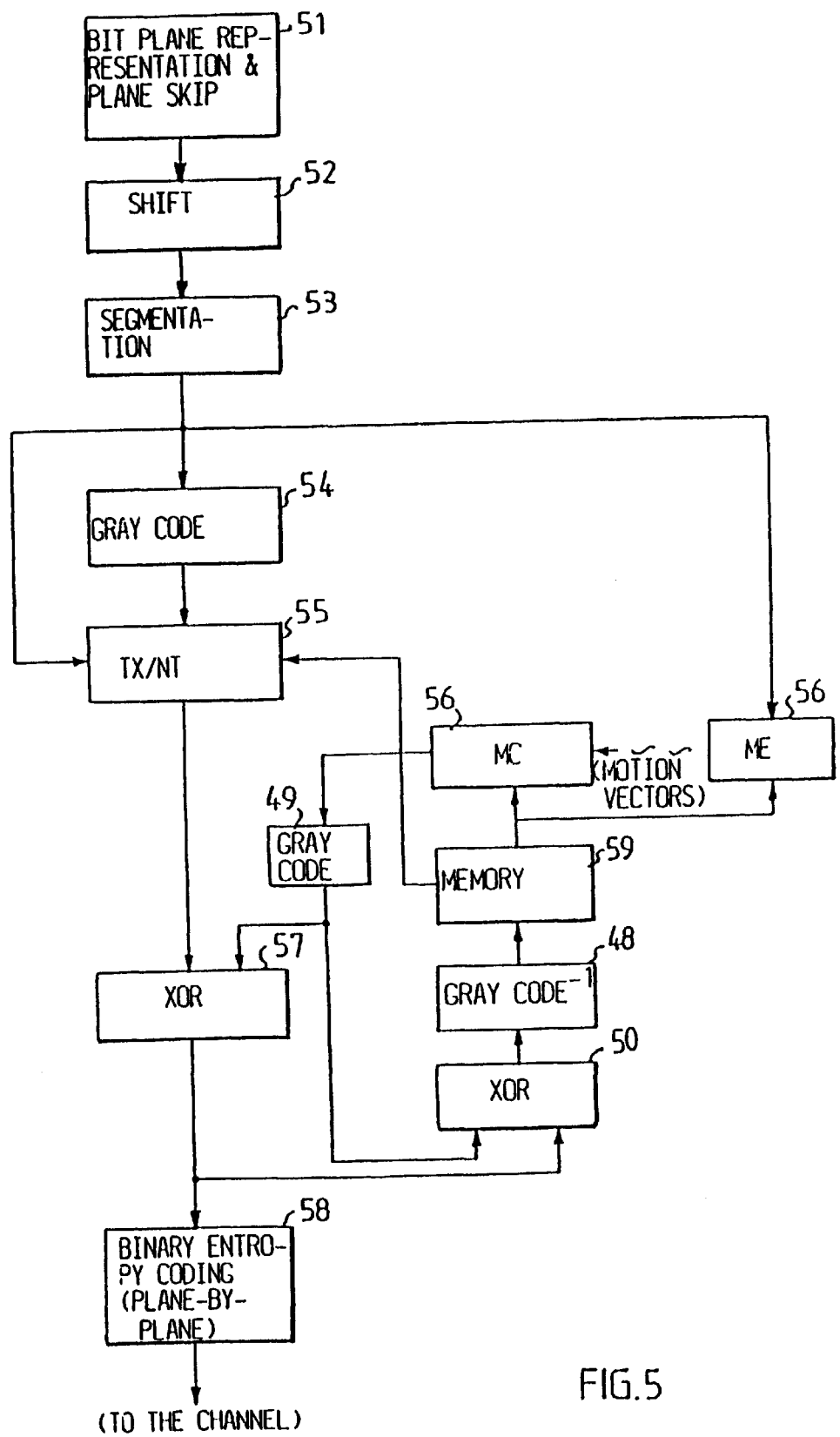
FIG. 5 is a block diagram of a system similar to that of FIG. 4, which also has means for performing transmission/not transmission.

FIG. 5 shows a block diagram of more advanced embodiment of the system, which also comprises the transmitted/not transmitted (TX/NT) procedure described above and in addition a motion estimation/motion compensation procedure (ME/MC).

A motion estimation/motion compensation (ME/MC) procedure is a method for increasing the exploitation of the temporal redundancy, which is well known in literature. Such a procedure is used for reducing the information that must be transmitted, in particular in the case of a moving sequence in which the frames contain moving objects. The application of a ME/MC procedure then allows transmitting only the motion vectors of the moving object inside a region or a block of the frame. The methods for performing the motion estimation and the motion compensation are numerous and are well known. The object of the MC procedure is thus to reduce the information that has to be transmitted, in this case the number of variations.

In the case of the above described system, aiming at providing a low cost video coding equipment and at reducing the entropy of the information, and thus in the end the necessary bit rate, the motion compensation procedure can advantageously be used in association with the transmitted/not transmitted (TX/NT) procedure.

That is, first the TX/NT procedure is applied. This results in that some of the regions of the segmented frame are decided not to be transmitted (NT). Thereafter some known motion estimation procedure is applied to predict the motion of the regions or blocks of the frames, which by the comparison between the used quality factor and the used threshold have been decided to be transmitted. The regions which based on a motion estimation have been motion compensated (MC) will then be made subject to the further compression in the following steps of the system, i.e. the XOR operation and the plane-by-plane entropy coding. The information associated with the motion will be transmitted as motion vectors according to some suitable known method described in the literature.

The introduction of motion compensation (MC) will only reduce the information to be transmitted. This is due to the lossless compression of the following steps of the compression. Hence, this operation will not modify the visual quality at all, i.e. the quality will be exactly the same as for the case including only the transmitted/not transmitted procedure.

The introduction of the ME/MC will however increase the computation al load on the system, but since the regions of the frames that are subject to motion estimation are only the transmitted ones (TX), the computational load will not increase heavily. A low-cost approach to the ME/MC is then used.

A system using all of the steps described above is hence illustrated in FIG. 5. That is, the bit plane represented frames that remain after the plane skipping procedures indicated in a block 51, are put into a block 52 where the shift operation as described in association with FIG. 3 is performed. The frames are then segmented into suitable blocks or regions in a block 53. Then the Gray code is applied in a block 54. The result of the operation in block 53 is also fed both to a block 55 and to a motion estimation block 56. Then a transmit/not transmit (TX/NT) operation is performed in block 551 preferably by means of a MSE algorithm as a measure of the visual distance. The decision is taken based on the similarity between a corresponding region of a previously transmitted frame stored in a memory 59 and the current region as fed from the block 53.

After that, the remaining blocks or regions, i.e. the blocks determined to be transmitted (TX) are subjected to a motion estimation (ME), resulting in predicted motion compensated (MC) blocks. This is carried out in block 56 by means of feeding the a previously transmitted corresponding block to the ME/MC block 56 from the memory 59 which has been provided with a decoded shifted and segmented version of the previously transmitted frame(s) from a decoder comprising of an XOR block 50, which performs an XOR operation between the output from a Gray code block 49 connected to the motion compensation block 56, and the output from block 57 and a block 48 performing an inverse Gray coding, and thereby reconstructing the shifted and segmented image as received by a receiver. Thereafter the XOR operation is performed in the block 57 between the current region and a motion compensated, and in block 49 Gray coded region of a previously transmitted corresponding region, and finally the information is coded by means of a plane-by-plane entropy coder in block 58.

For performing the motion estimation, for instance the block matching method, which is described in A. N. Netravali and B. G. Haskell, "Digital pictures", 2nd ed. Plenum Press 1995 p. 340 and which is also employed and described in ITU-T Recommendation H261, Geneva, August 1990, can be used.

The compression method described above as illustrated in FIG. 4, in particular in the case where all of the steps discussed with reference to this figure are used, generates highly compressed grey scale or colour images, which are well suited to be transmitted on narrow band channels, having capacities around 25–30 kbps. The method can also incorporate more advanced procedures such as a transmit/not transmit (TX/NT) procedure and/or a motion compensation (MC) procedure as illustrated in FIG. 5, which will increase the computational load and complexity somewhat, but in return will greatly lower the necessary bit rate.

The various substeps of the method only comprise elementary operations such as shifts, table look-up and XOR-operations, which makes the construction cost of a transmitting system using some or all of the substeps low. Moreover, the low complexity contributes to make the method very well suited for real time applications.

However, if a high compression is the main object, and the cost for implementing the compression system is regarded as a matter of secondary importance, the performance of the system can be further improved.

Figure 6:
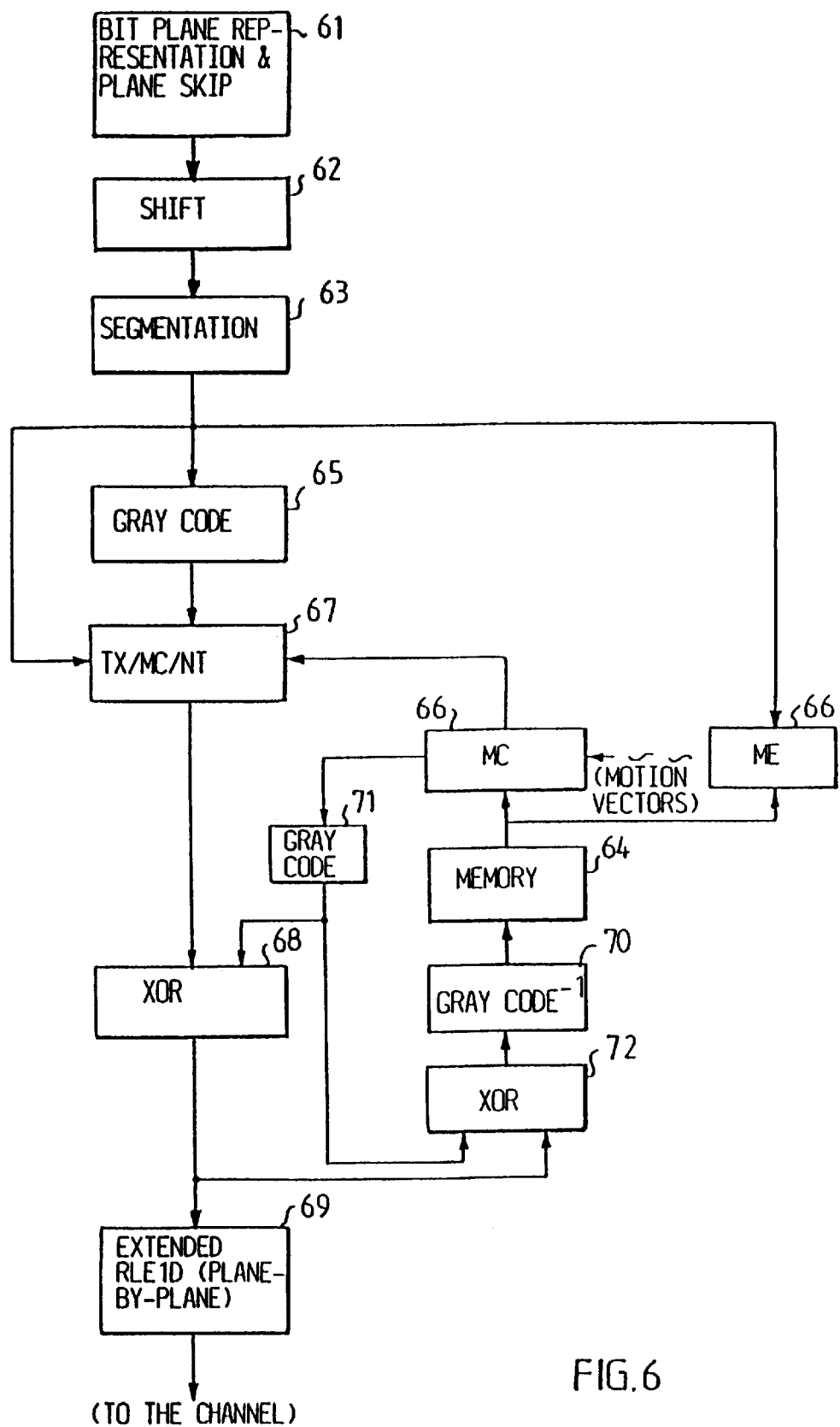
FIG. 6 is a block diagram similar to that of FIG. 4 illustrating a system intended for a more advanced compression.

This is achieved by means of the introduction of an exhaustive approach to the motion estimation/motion compensation (ME/MC). Such a system will now be described with reference to the block diagram of FIG. 6.

The system consists of all the elements described above, but some additional blocks have been added. Thus, the bit plane represented frames that have been subject to the plane skipping mechanism enter the system at 61. The frames are then shifted according to the procedure described in association with FIG. 3. in a block 62. Then the frames are divided into regions, also called blocks or segments, in a block 63.

These blocks or segments are in the simplest and perhaps most common approaches square blocks of RxR pixels, but the blocks or segments can also have other proportions or have irregular shapes. This division or segmentation of the frames into smaller regions allows the system to identify and localize parts or regions inside the picture which in some aspect are not of interest for the final result, or to exploit the redundancies in the separate block more efficiently than the whole image, e.g. by means of motion compensation.

The segmented image is then subjected to further processing in the blocks 67 and 66. Next the segmented image is coded with the Gray code in a block 65 as described above. After this the whole picture is scanned block by block or segment by segment in order to perform a motion estimation (ME) of the objects inside the picture. This motion estimation is performed according to one of the many well known procedures described in literature and using the previous decoded picture, which has been stored in the memory block 64. The decoding procedure is performed in the XOR and inverse Gray code blocks 72 and 70 producing a reconstructed shifted and segmentated version of the received image in the same manner as described above in conjunction with the blocks 48 and 50 in FIG. 5.

All blocks are now subjected to the ME in block 66. From this point of view, the technique is much more computational expensive than the previously described technique. On the other side, it will be able to achieve higher compression ratios.

The outcome of the motion estimation is used to form a predicted motion compensated picture, which reduces the number of blocks or segments to be transmitted and the number of variations inside the blocks. Thus, regarding the motion information, only the motion parameters (motion vectors) of these motion compensated blocks in relation to the previous blocks need to be transmitted. These motion estimations and motion compensations of the blocks or segments are performed in blocks 66.

The motion estimation method used, can for instance be the block matching method, described in A. N. Netravali and B. G. Haskell, "Digital pictures", 2nd ed. Plenum Press 1995 p. 340 and which also is employed and described in ITU-T Recommendation H261, Geneva, August 1990.

A comparison is then performed of the corresponding regions of the two frames, i.e. the current one and the previous. The decoded previous frame is, as mentioned above, available in the block 64. The aim of this comparison is to obtain some kind of visual distance parameter value. The visual distance parameter shall estimate the distance between the two corresponding regions inside the two frames from a visual point of view. As mentioned above it is of interest to get the visual distance parameter as much correlated as possible to the visual perception of the two corresponding regions of the two frames, i.e. the more alike the two corresponding regions of the two frames look, the smaller (or higher) the value of the visual distance parameter adopts.

Based on this segment by segment comparison the system then decides, for a particular segment, whether all of the information of the region or segment in question, i.e. motion parameters and variations, is to be transmitted (TX), or if it is sufficient to only transmit the motion parameters of the motion compensated (MC) region, or if it is unnecessary to transmit the region at all, i.e. neither motion parameters nor variations, and thus not transmit (NT) the region. The comparison and the decision is made in block 67 between the output from block 63 and the outputted motion compensated version of a previously transmitted segment from block 66. The motion parameters of the segments that are decided to be transmitted (TX) and motion compensated (MC) are then transmitted according to some known technique. The frames that are decided to be transmitted (TX) are then subject to the above described XOR operation in block 68 to which the current segment and a Grey coded version of the output from block 66 is fed. The Gray coding of the output segment from block 66 is performed in a block 71. The result of this operation is, as described in detail above, that bits that remain unchanged are coded as zeroes and bits that have changed are coded as ones. In the case where few changes occur, a phenomena that is increased by the motion estimation procedure, the output binary sequence will consist of many binary zeroes and some, often isolated, binary ones.

In order to exploit this bit pattern, a special type of mono-dimensional run length encoding (RLE1D) has been developed for the plane-by-plane entropy coding stage. The conventional RLE1D encoding is illustrated in FIG. 7a. This method is well known and can in short be described as a method for exploiting binary sequences having relatively few transitions between binary ones and binary zeroes, i.e. long runs. This is performed in such manner that two separate alphabets are used, one for the zeroes and one for the ones, e.g. B (Black) for zeroes and W (White) for ones. The sequence is then coded as runs of ones and zeroes, e.g. seven zeroes are coded 7B and a following four ones are coded 4W, see also the example in FIG. 7a. It is easily seen that in the case of long runs of successive ones and zeroes this procedure reduces th e number of symbols of the sequence, which from a statistic point of view will lead to an increase in the compression.

Nevertheless, as stated above, the output sequence of the XOR block 68, is expected to consist of a relatively large number of isolated ones. In order to exploit this type of bit pattern, an extension of the RLE1D procedure has been developed, which is called extended RLE1D. This developed procedure exploits the condition of isolated ones in such a manner that, unlike the conventional RLE1D procedure, each run of ones or zeroes will include one transition at the end, i.e. that each run of ones will have one zero as its last symbol and that this entire sequence will be coded with one symbol and vice versa. The technique is shown as an example in FIG. 7b, where the same sequence coded by means of the conventional RLE1D in FIG. 7a is coded with the extended RLE1D technique. Thus, for example, with the extended RLE1D a run consisting of three binary zeroes followed by a binary one can be coded as 4B, i.e. a count of the length of the run and an indication of the first binary symbol in the run. In the examples of FIGS. 7a and 7b the number of isolated ones is relatively high and the number of runs needed to be coded have decreased from 20 in FIG. 7a to 11 in FIG. 7b. Thus, a substantial reduction of information has been achieved. It is also easily seen that the use of the extended RLE1D will always be superior or at worst, in the case of no isolated ones or zeroes at all, equal to the conventional RLE1D encoding technique.

The extended RLE1D procedure is performed plane-by-plane in block 69, before the sequence is transmitted onto a channel. Experiments have shown that the described compression system is able to obtain moving pictures of very good quality at 10–16 kbps, and under some conditions bit rates down to 6–7 kbps have been obtained.

Finally, the method as described can easily be extended to lossless applications. In such a case no planes are skipped, i.e. no bit planes are removed before the compression. Also, the threshold for the TX/NT operation is set to zero, i.e. all blocks which have changed are compressed and transmitted. Thus, no distortions are introduced and the compression becomes lossless.

The same operation of the Gray code is used, since no planes are skipped there is no need for a shift operation, i.e. the Gray code is applied directly in its proper lossless conditions. Then, the XOR operation and an entropy coding of all of the planes are applied. Different coding schemes can be applied for different bit planes according to their different characteristics. For example, most significant bit planes have lower numbers of ones (isolated ones) and are more structured, whereas least significant bit planes have an almost equal number of ones and zeroes, and this can be taken into account when choosing a proper coding scheme. Also, as an option, an ME/MC scheme can be introduced. However, in most cases the improvement would be quite small.

The lossless extension of the method is of interest for some specific applications. In the case of real-time lossy applications (video telephony, video conference), the quality is good enough for the normal video communication, but is usually not good enough in some specific cases, such as the transmission of documents, or graphics and drawings. It is also not good enough for specific applications, such as in the case when transmission is made for medical or legal reasons. In these cases a freeze of a particular image can be done and a lossless transmission can be set-up for that specific image before switching back to the normal conditions of real-time lossy communication, by means of only changing a few parameters in the compression algorithms, i.e. for the plane skipping and for the threshold for the transmit/not transmit (TX/NT) procedure.

Another field of application for the lossless coding is for storage purposes. Huge amounts of memory is required for storing sequences, for example by television companies, multimedia producers, and network companies. MPEG I and MPEG II standards are usually applied for reducing the memory occupation, but these techniques are lossy and introduce a degradation in the sequences. In the case where no distortions are required and where sequences need to be reproduced exactly with the same quality, lossless compression systems are required.

Lossless still-image compression techniques can then be applied to each frame separately, but no temporal redundancy, i.e. correlation between the frames, is taken into account in this case. The method and system as described herein provide a solution to the problem, which not only is able to guarantee flexibility, including the possibility to introduce smaller or larger amounts of distortion if higher compression ratios are required, but which also is simple and which allows exploitation of temporal redundancy inside sequences without an increase in the signal to be processed.

What is claimed is:

1. A method of lossy compression of a digitalized image, the method comprising the steps of:

representing the image with a binary bit plane representation, and reducing the information content in the image by removing at least the least significant binary bit plane of the binary bit plane represented image;

wherein, after said reducing, remaining binary bit planes are shifted into less significant positions, and that the positions made vacant when the remaining planes are shifted are padded with zeroes, and wherein pixels formed by the shifted bit planes are coded with a Gray code.

2. A method according to claim 1, characterized in that an exclusive OR (XOR) operation is performed between the bits of two bit planes from the different images resulting in a third bit plane indicating the bits which are different between the two different bit planes.

3. A method according to claim 2, characterized in that a binary output sequence from the XOR operation is divided into runs in such a manner that there is one transition between the penultimate and the ultimate binary symbol in each run, and encoding each such run by one code word.

4. A system for transmission of bit plane represented moving pictures comprising:

a transmitter and a receiver, wherein the transmitter comprises means for skipping one or several bit planes of an input bit plane represented moving picture, means connected to the skipping means for shifting the pixels or the bits planes of such a plane skipped image, means connected to the shifting means for padding the positions made vacant by the shifting of the pixels with zeroes, means connected to the zero padding means for coding the pixels of the shifted bit planes with a Gray code, means connected to the Gray coding means for comparing two bit planes of two different images using an exclusive OR (XOR) operation and for forming a third bit plane indicating the bits which are different between the two different bit planes, means connected to the XOR operation means for coding and transmitting an output sequence from the XOR operation means with an entropy code and that the receiver comprises corresponding means for decoding and decompressing received pictures; and means connected to the Gray coding means for carrying out a segmentation of a plane skipped image, and for performing a transmit/not transmit (TX/NT) operation on such a segmented image.

5. A system for transmission of bit plane represented moving pictures comprising:

a transmitter and a receiver, wherein the transmitter comprises means for skipping one or several bit planes of an input bit plane represented moving picture, means connected to the skipping means for shifting the pixels or the bits planes of such a plane skipped image, means connected to the shifting means for padding the positions made vacant by the shifting of the pixels with zeroes, means connected to the zero padding means for coding the pixels of the shifted bit planes with a Gray code, means connected to the Gray coding means for comparing two bit planes of two different images using an exclusive OR (XOR) operation and for forming a third bit plane indicating the bits which are different between the two different bit planes, means connected to the XOR operation means for coding and transmitting an output sequence from the XOR operation means with an entropy code and that the receiver comprises corresponding means for decoding and decompressing received pictures; and means connected to the Gray coding means for carrying out a segmentation of a plane skipped image, means for performing a motion estimation (ME), and means for performing a transmit/motion compensation/not transmit (TX/MC/NT) operation on such a segmented image.

* * * * *

UNITED STATES PATENT AND TRADEMARK OFFICE
CERTIFICATE OF CORRECTION

PATENT NO. : 6,208,761 B1
DATED : March 27, 2001
INVENTOR(S) : Filippo Passaggio It is certified that error appears in the above-identified patent and that said Letters Patent is hereby corrected as shown below:

<u>Title page,</u>
Related U.S. Application Data, Please add the following:
Item [63], Continuation of application No. PCT/SE96/00943, filed on Jul. 11, 1996.

Signed and Sealed this

Sixteenth Day of October, 2001

Attest:

NICHOLAS P. GODICI
Attesting Officer *Acting Director of the United States Patent and Trademark Office*